(12) United States Patent
Zhang et al.

(10) Patent No.: US 12,503,964 B2
(45) Date of Patent: Dec. 23, 2025

(54) CASCADED ENERGY STORAGE SYSTEM AND ENERGY STORAGE METHOD THEREOF

(71) Applicant: XECA TURBO (CHENGDU) TECHNOLOGY CO., LTD, Chengdu (CN)

(72) Inventors: Xuefeng Zhang, Chengdu (CN); Jiecheng Chi, Chengdu (CN); Kaiyun Zheng, Chengdu (CN); Guohua Yu, Chengdu (CN); Mengying Shu, Chengdu (CN); Lin Tao, Chengdu (CN); Jiangtao Bai, Chengdu (CN)

(73) Assignee: XECA TURBO (CHENGDU) TECHNOLOGY CO., LTD, Chengdu (CN)

( * ) Notice: Subject to any disclaimer, the term of this patent is extended or adjusted under 35 U.S.C. 154(b) by 0 days.

(21) Appl. No.: 18/900,837

(22) Filed: Sep. 29, 2024

(65) Prior Publication Data
US 2025/0020109 A1    Jan. 16, 2025

Related U.S. Application Data

(63) Continuation of application No. PCT/CN2023/120123, filed on Sep. 20, 2023.

(30) Foreign Application Priority Data

Dec. 21, 2022  (CN) .......................... 202211646638.3

(51) Int. Cl.
*F01K 25/10* (2006.01)
*F02C 1/02* (2006.01)
(Continued)

(52) U.S. Cl.
CPC .............. *F01K 25/103* (2013.01); *F02C 1/02* (2013.01); *F02C 1/06* (2013.01); *F02C 6/16* (2013.01)

(58) Field of Classification Search
CPC .. F01K 25/103; F02C 1/02; F02C 1/06; F02C 6/16
See application file for complete search history.

(56) References Cited

U.S. PATENT DOCUMENTS

2014/0091574 A1*  4/2014  Favy .......................... F02C 6/16
                                                                  137/209
2015/0362124 A1* 12/2015  Favy .......................... F02C 6/16
                                                                  206/0.6
(Continued)

FOREIGN PATENT DOCUMENTS

CN          202970911 U      6/2013
CN          104533556 A      4/2015
(Continued)

OTHER PUBLICATIONS

First Office Action issued in counterpart Chinese Patent Application No. 202211646638.3, dated Jan. 31, 2023.
(Continued)

*Primary Examiner* — Matthew Wiblin
(74) *Attorney, Agent, or Firm* — Westbridge IP LLC

(57) ABSTRACT

A cascaded energy storage system includes: a gas storage which is divided into at least one air chamber and at least one working medium gas chamber by a flexible diaphragm, where pressure of the air chamber is equal to pressure of the working medium gas chamber, and volume of the air chamber and volume of the working medium gas chamber is capable of being adjusted by contraction and expansion of the flexible diaphragm; an air compression and energy release assembly which communicates with the air chamber, and is configured to introduce compressed air into the air
(Continued)

chamber and release the compressed air; a working medium gas-liquid conversion assembly including a working medium compression assembly, a working medium expansion assembly and a liquid storage assembly; and a heat storage assembly, configured to release heat or store heat to the working medium gas-liquid conversion assembly.

20 Claims, 3 Drawing Sheets

(51) Int. Cl.
*F02C 1/06* (2006.01)
*F02C 6/16* (2006.01)

(56) References Cited

U.S. PATENT DOCUMENTS

| | | | | |
|---|---|---|---|---|
| 2020/0088095 | A1* | 3/2020 | Kubo | F28D 20/0034 |
| 2021/0003031 | A1* | 1/2021 | Nakamichi | H02P 5/74 |
| 2021/0017905 | A1* | 1/2021 | Matsukuma | H02J 7/345 |

FOREIGN PATENT DOCUMENTS

| | | | | |
|---|---|---|---|---|
| CN | 105043147 | A | 11/2015 | |
| CN | 109140797 | A | 1/2019 | |
| CN | 110578567 | A | 12/2019 | |
| CN | 111550389 | A | 8/2020 | |
| CN | 111853845 | A | 10/2020 | |
| CN | 112796981 | A | 5/2021 | |
| CN | 113932564 | A | 1/2022 | |
| CN | 113982708 | A | 1/2022 | |
| CN | 115031152 | A | 9/2022 | |
| CN | 115163229 | A | 10/2022 | |
| CN | 115492651 | A | 12/2022 | |
| CN | 115580030 | A | 1/2023 | |
| CN | 115632488 | A | 1/2023 | |
| CN | 117267096 | A | * 12/2023 | F04B 41/02 |

OTHER PUBLICATIONS

International Search Report issued in corresponding PCT Application No. PCT/CN2023/120123, dated Dec. 5, 2023.

* cited by examiner

CASCADED ENERGY STORAGE SYSTEM AND ENERGY STORAGE METHOD THEREOF

CROSS-REFERENCE TO RELATED APPLICATIONS

The present application is a continuation of International Application No. PCT/CN2023/120123, filed on Sep. 20, 2023, which claims priority to Chinese Patent Application No. 202211646638.3, filed on Dec. 21, 2022. The disclosures of the aforementioned applications are hereby incorporated by reference in their entireties.

TECHNICAL FIELD

The present disclosure relates to the field of energy storage technologies, and in particular, to a cascaded energy storage system and an energy storage method thereof.

BACKGROUND

Compressed gas energy storage technology is that a power energy storage system which is capable of realizing large-capacity and long-time electric energy storage stores excess power by compressing atmospheric pressure gas to high-pressure gas through a compressor and storing the high-pressure gas, and releases and expands the high-pressure gas to generate power when power is needed. The compressed gas energy storage mainly includes two modes: compressed air energy storage and compressed carbon dioxide energy storage. In an apparatus for compressed gas energy storage, a gas storage with ultra-large volume needs to be configured to store gas.

The compressed air energy storage adopts a high-pressure gas storage method with a gas storage pressure being as high as 10 MPa or more. Generally, a gas storage adopts a fixed volume and variable pressure operation mode, and a basic air pressure of the gas storage is 7 MPa. When storing energy, air is injected into the gas storage until the pressure reaches 10 MPa. When releasing the energy, the gas storage discharges the air until the pressure returns to 7 MPa. That is to say, merely 30% of the total gas volume after the gas storage is fully filled is used for power generation, so that a utilization rate of the volume of the gas storage is low, which is unfavorable to economy. On the other hand, in the variable pressure operation mode of the gas storage, the compressor is always in a variable working condition operating state during a gas-injection process. During a discharging process, the compressed air is released to a specified pressure by throttling, and then enters in an expander, so that there is throttling loss, and an operating condition of the system is not good, resulting in loss of efficiency of the energy storage, and thus operating efficiency of an energy storage power station is adversely affected.

The compressed carbon dioxide energy storage adopts an atmospheric pressure gas storage method. Generally, a gas storage adopts a variable volume and constant atmospheric pressure operating mode. When storing energy, the gas storage discharges carbon dioxide, the carbon dioxide is compressed to a pressure of more than 7 MPa, and the high-pressure carbon dioxide may be directly condensed into liquid carbon dioxide by environment (specifically, by natural cooling conditions in the environment, such as air cooling which uses air for cooling, or water cooling which uses natural water such as river and seawater for cooling) and stored in a storage tank. When releasing energy, the liquid carbon dioxide is vaporized and expanded to atmospheric pressure, and then returns to the gas storage. In a process of energy storage and release under a normal working condition, a compressor and an expander are each in a constant working condition operating state. However, the gas storage storing carbon dioxide with atmospheric pressure has huge volume which may be up to hundreds of thousands or even millions of cubic meters, and covers an area of tens of thousands or even hundreds of square meters, so that an application of a compressed carbon dioxide energy storage technology in industrial user scenarios is limited, and it is also very unfavorable for promotion and application of energy storage on a power grid side and a power supply side.

SUMMARY

The present disclosure is aimed at solving one of the technical problems in the related art to a certain extent.

To this end, the purpose of the present disclosure is to provide a cascaded energy storage system and an energy storage method thereof, where the cascaded energy storage system has a low gas storage pressure and good safety, and volume of the gas storage is reduced by more than 80% than volume of an atmospheric pressure gas storage. Under a gas storage pressure of 3 MPa or above, the volume of the gas storage is less than volume of a high-pressure gas storage with fixed volume. A working condition with constant gas storage pressure may be realized, in which processes of compression and expansion of gas are both operated under a constant working condition, there is no throttling loss, so that efficiency of energy storage is high, and a cost of construction is controllable. The present disclosure may be applied to an industrial user side with a megawatt level for energy storage, and may also be applied to a power grid side or a power supply side with a ten-megawatt level or a hundred-megawatt level for energy storage.

To achieve the foregoing purpose, the present disclosure provides a cascaded energy storage system, including:

- a gas storage which is divided into at least one air chamber and at least one working medium gas chamber by a flexible diaphragm, pressure of the air chamber being equal to pressure of the working medium gas chamber, and volume of the air chamber and volume of the working medium gas chamber being capable of being adjusted by contraction and expansion of the flexible diaphragm;
- an air compression and energy release assembly which communicates with the air chamber, and is configured to inject compressed air into the air chamber and release the compressed air;
- a working medium gas-liquid conversion assembly including a working medium compression assembly, a working medium expansion assembly and a liquid storage assembly;
- where the liquid storage assembly includes a liquid storage tank and a liquid heater; an outlet of the working medium gas chamber, the working medium compression assembly and an inlet of the liquid storage tank are sequentially connected through a working medium hydraulic pipeline; an outlet of the liquid storage tank, the working medium expansion assembly, a hot side of the liquid heater and an inlet of the working medium gas chamber are sequentially connected through a working medium vaporization pipeline; and the outlet of the liquid storage tank, a cold side of the liquid heater and the inlet of the liquid storage tank are sequentially connected through a maintaining pipeline; and a heat storage assembly, configured to release heat or store heat to the air compression and energy release assembly and the working medium gas-liquid conversion assembly under different working conditions of the air compression and energy release assembly and the working medium gas-liquid conversion assembly.

In some embodiments, the air compression and energy release assembly includes an air compression assembly, the air compression assembly includes an air compressor unit and an air heat exchanger unit, an outlet of the air compressor unit is connected to an inlet of the air chamber, the air compressor unit is configured to compress air, the air heat exchanger unit is configured to recover heat in compressed air discharged by the air compressor unit and transfer the heat to the heat storage assembly, and the compressed air after heat exchange is transported into the air chamber.

In some embodiments, the air compressor unit includes air compressors which are connected in series in multiple-stages, the air heat exchanger unit includes air heat exchangers in multiple-stages, and the air compressors are in one-to-one correspondence with the air heat exchangers.

In some embodiments, the air compression and energy release assembly further includes an air expansion assembly, an inlet of the air expansion assembly is connected to an outlet of the air chamber, and the air expansion assembly is configured to expand the compressed air to generate power, where the air expansion assembly includes an air expander unit and an air reheater unit, the compressed air in the air chamber enters the air expander unit to expand to generate power, and the air reheater unit is configured to heat the compressed air entering the air expander unit.

In some embodiments, the air expander unit includes air expanders connected in series in multiple-stages, the air reheater unit includes air reheaters in multiple-stages, and the air expanders are in one-to-one correspondence with the air reheaters.

In some embodiments, the working medium compression assembly includes a working medium compressor unit, a working medium heat exchanger unit and a working medium condenser, where the working medium compressor unit is configured to compress a gas working medium, the working medium heat exchanger unit is configured to recover heat of working medium compressed gas which is discharged by the working medium compressor unit and transfer the heat to the heat storage assembly, the working medium condenser is connected to the working medium compressor unit and configured to condense the working medium compressed gas into a liquid working medium, and the liquid working medium is transported into the liquid storage tank.

In some embodiments, the working medium compressor unit includes working medium compressors which are connected in series in multiple-stages, the working medium heat exchanger unit includes working medium heat exchangers in multiple-stages, and the working medium compressors are in one-to-one correspondence with the working medium heat exchangers.

In some embodiments, the working medium expansion assembly includes a working medium expander unit, a working medium reheater unit and a working medium vaporizer, where the liquid working medium after being vaporized is expanded to generate power in the working medium expander unit; the working medium reheater unit is configured to heat a working medium entering the working medium expander unit; an inlet of the working medium vaporizer is connected to the outlet of the liquid storage tank, an outlet of the working medium vaporizer is connected to the working medium reheater unit, and the working medium vaporizer is configured to heat and vaporize the liquid working medium; and an outlet of the working medium expander unit is connected to the liquid heater.

In some embodiments, a plurality of heating channels are provided in the working medium vaporizer for absorbing residual heat from the heat storage assembly and external residual heat or waste heat.

In some embodiments, the working medium expander unit includes working medium expanders which are connected in series in multiple-stages, the working medium reheater unit includes working medium reheaters in multiple-stages, and the working medium expanders are in one-to-one correspondence with the working medium reheaters.

In some embodiments, the heat storage assembly includes a plurality of groups of high temperature tanks and low temperature tanks which are respectively connected to air heat exchangers, air reheaters, working medium heat exchangers and working medium reheaters, and are configured to store heat from the air heat exchangers and the working medium heat exchangers, and releases heat to the air reheaters, the working medium reheaters, and a working medium vaporizer.

In some embodiments, each group of the plurality of groups of the high temperature tanks and the low temperature tanks includes a hot tank and a cold tank which are used in pairs, where a heat transfer medium with low-temperature in the cold tank absorbs the heat in the air heat exchangers and the working medium heat exchangers and then becomes the heat transfer medium with high-temperature to be stored in the hot tank; and the heat transfer medium in the hot tank releases the heat to the air reheaters, the working medium reheaters and the working medium vaporizer, and then becomes the heat transfer medium with low-temperature to be stored in the cold tank.

In a second aspect, the present disclosure also provides an energy storage method for a cascaded energy storage system, which is performed by using the energy storage system according to any one of the foregoing embodiments, including:

an energy storage stage, in which the air chamber in an initial stage being in an emptying state and the working medium gas chamber being fully filled with a gas working medium in a first pressure range, and the energy storage stage including a gas working medium compression and liquefaction energy storage sub-stage and an air compression energy storage sub-stage which are performed at the same time, where the gas working medium compression and liquefaction energy storage sub-stage includes: discharging, from the working medium gas chamber, the gas working medium, and compressing, by a working medium compressor unit, the gas working medium to a first temperature range and a second pressure range, during which recovering, by a working medium heat exchanger unit, compression heat of the gas working medium, and condensing and liquefying to a second temperature range, the gas working medium, and then transporting to the liquid storage tank until the working medium gas chamber is emptied;

the air compression energy storage sub-stage includes: starting an air compressor unit to compress air to a third temperature range and a third pressure range and transporting the air to the air chamber, during which recovering, by an air heat exchanger unit, compression heat of the air, until compressed air reaches to a fourth temperature range, and stopping when the air chamber is fully filled with the compressed air and a fourth pressure range is reached; and an energy release stage including a liquid working medium vaporization and expansion energy release sub-stage and a compressed air energy release sub-stage which are performed simultaneously, where:

the liquid working medium vaporization and expansion energy release sub-stage includes: flowing, out of the liquid storage tank, a high-pressure liquid working medium in a fifth pressure range, and introducing into a working medium expander to generate power after being vaporized by a working medium vaporizer and heated by a working medium reheater; transporting to the hot side of the liquid heater, the gas working medium in a sixth pressure range after power generation, and heating the liquid working medium flowing into the cold side of the liquid heater from the liquid storage tank to vaporize; and returning, to the liquid storage tank, the gas working medium at an outlet of the cold side of the liquid heater, and transporting, to the working medium gas chamber, the gas working medium at an outlet of the hot side of the liquid heater.

In some embodiments, the compressed air energy release sub-stage includes: heating, by an air reheater, the compressed air, and then expanding to generate power in an air expander until the air chamber is emptied and the working medium gas chamber is fully filled.

In some embodiments, the compressed air energy release sub-stage includes transporting, from the air chamber, the compressed air to a gas consumer, and the recovered compression heat of the air is transported to a heat consumer.

In some embodiments, the first pressure ranges from 0.5 MPa to 15 MPa, the first temperature ranges from 100° C. to 500° C., the second pressure ranges from 1 MPa to 30 MPa, the second temperature ranges from 20° C. to 30° C., the third temperature ranges from 100° C. to 500° C., the third pressure ranges from 0.5 MPa to 15 MPa, the fourth temperature ranges from 20° C. to 40° C., and the fourth pressure ranges from 0.5 MPa to 15 MPa.

In some embodiments, the fifth pressure ranges from 1 MPa to 30 MPa, and the sixth pressure ranges from 0.5 MPa to 15 MPa.

Additional aspects and advantages of the present disclosure will be set forth in the following description, which will become apparent from the following description, or will be learned from a practice of the present disclosure.

BRIEF DESCRIPTION OF THE DRAWINGS

The above and/or additional aspects and advantages of the present disclosure will become apparent and easily understood from the following descriptions with reference to the accompanying drawings.

DETAILED DESCRIPTION OF THE EMBODIMENTS

Figure 1:
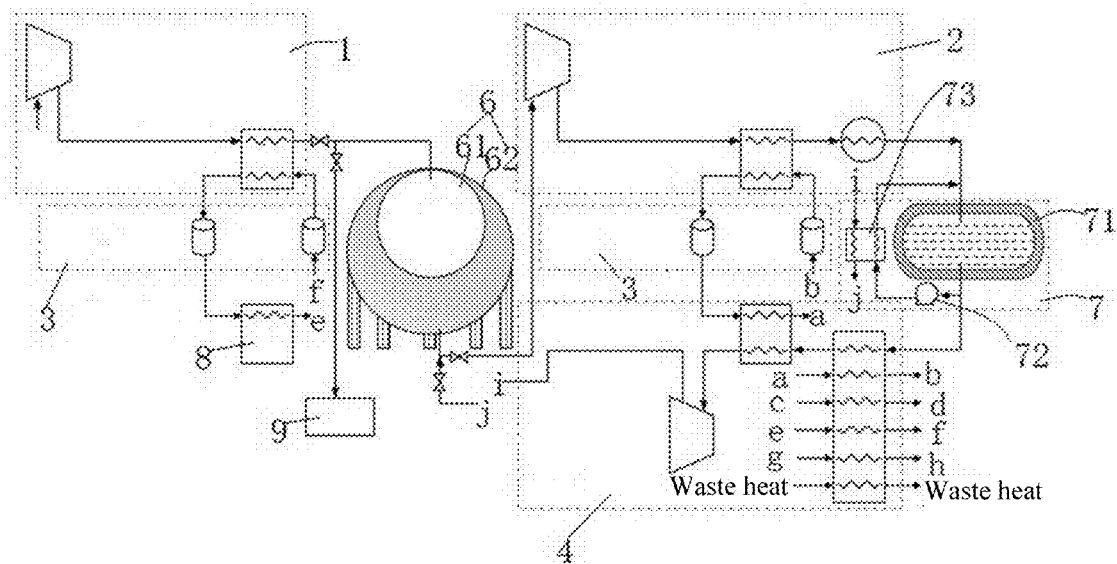
FIG. 1 is a schematic structural diagram of a cascaded energy storage system according to an embodiment of the present disclosure.

Hereinafter, embodiments of the present disclosure will be described in detail, examples of the embodiments are shown in the drawings, where the same or similar reference numerals throughout indicate the same or similar elements or elements having the same or similar functions. The embodiments described below by referring to the drawings are exemplary and are merely used to explain the present disclosure, and should not be understood as limitations of the present disclosure. On the contrary, the embodiments of the present disclosure include all changes, modifications and equivalents which fall within the spirit and scope of the claims.

Referring to FIG. 1, in order to achieve the foregoing purpose, the present disclosure provides a cascaded energy storage system, which includes a gas storage 6, an air compression energy release assembly, a working medium gas-liquid conversion assembly and a heat storage assembly 3.

The gas storage 6 may be understood as a pressure vessel which is on the ground or a cave which is underground. The gas storage 6 is divided into at least one air chamber 61 and at least one working medium gas chamber 62 by a flexible diaphragm. Pressure of the air chamber 61 is equal to pressure of the working medium gas chamber 62, volume of the air chamber 61 and volume of the working medium gas chamber 62 is adjustable, and air and a working medium do not permeate each other. The working medium is an organic working medium, carbon dioxide, a refrigerant, nitrous oxide, sulfur hexafluoride, ammonia and the like.

Specifically, the air chamber 61 and the working medium gas chamber 62 are separated by a flexible diaphragm. The pressure of the air chamber 61 is equal to the pressure of the working medium gas chamber 62, the volume of the air chamber 61 and the volume of the working medium gas chamber 62 may be adjusted by contraction and expansion of the flexible diaphragm, and the air in the air chamber 61 and the working medium in the working medium gas chamber 62 will not permeate each other. Illustratively, the working medium in the present embodiment is a gas, for example, the organic working medium, the carbon dioxide, the refrigerant, the nitrous oxide, the sulfur hexafluoride, the ammonia and the like. In addition, it should be noted that a material of the flexible diaphragm is compatible with the working medium, that is, the flexible diaphragm will not react with the working medium gas to produce a chemical reaction or other reactions. Illustratively, as shown in FIG. 1, the gas storage 6 stores gas by using a pressure vessel of a spherical tank type, and the flexible membrane is used in the spherical tank to separate the air from the working medium in the gas storage 6. The air chamber 61 is formed in the flexible membrane, and the working medium gas chamber 62 is located between the flexible membrane and an inner wall of the spherical tank. That is, the flexible diaphragm is a deformable and soft membrane structure, where working pressure of the air chamber 61 is equal to working pressure of the working medium gas chamber 62, and preferably, the working pressure ranges from 0.5 MPa to 15 Mpa.

In the present embodiment, the pressure of the air chamber 61 is equal to the pressure of the working medium gas chamber 62, and the volume of the air chamber 61 and the volume of the working medium gas chamber 62 may be adjusted by contraction and expansion of the flexible diaphragm. It may be understood as that compressed air and the gas working medium may be introduced into the air chamber 61 and the working medium gas chamber 62 respectively, and a person skilled in the art may adjust the volume of the air chamber 61 and the working medium gas chamber 62 according to filling volume of the compressed air in the air chamber 61 and filling volume of the gas working medium in the working medium gas chamber 62. In an ultimate deformation state of the flexible diaphragm, the entire gas storage 6 may be occupied by the air chamber 61 or the working medium gas chamber 62.

The air compression and energy release assembly communicates with the air chamber 61, and is configured to introduce or release the compressed air into the air chamber 61. The heat storage assembly 3 may be configured to release heat or store the heat to the air compression and energy release assembly under different operation conditions of the air compression and energy release assembly.

The working medium gas-liquid conversion assembly includes a working medium compression assembly 2, a working medium expansion assembly 4 and a liquid storage assembly 7. The liquid storage assembly 7 includes a liquid storage tank 71 and a liquid heater 73. An outlet of the working medium gas chamber 62, the working medium compression assembly 2 and an inlet of the liquid storage tank 71 are sequentially connected through a working medium hydraulic pipeline. An outlet of the liquid storage tank 71, the working medium expansion assembly 4, a hot side of the liquid heater 73 and an inlet of the working medium gas chamber 62 are sequentially connected through a working medium vaporization pipeline. The outlet of the liquid storage tank 71, a cold side of the liquid heater 73, and the inlet of the liquid storage tank 71 are sequentially connected through a pressure maintaining pipeline.

Specifically, the outlet of the working medium gas chamber 62, the working medium compression assembly 2 and the inlet of the liquid storage tank 71 are sequentially connected through the working medium hydraulic line. That is, a gas working medium discharged by the working medium gas chamber 62 is compressed by the working medium compression assembly 2, and then is cooled to generate a liquid working medium. The liquid working medium flows into the inlet of the liquid storage tank 71 and is stored in the liquid storage tank 71. The working medium compression assembly 2 will generate compression heat of the gas working medium during a process of compressing the gas working medium, and this compression heat may be recovered to the heat storage assembly 3 through a heat exchanger. The outlet of the liquid storage tank 71, the expansion assembly, the hot side of the liquid heater 73 and the inlet of the working medium gas chamber 62 are sequentially connected through the working medium vaporization pipeline. That is, the liquid working medium flowing out of the liquid storage tank 71 is heated by the working medium expansion assembly 4. Meanwhile, the heat storage assembly 3 releases energy to the working medium expansion assembly 4 to vaporize the liquid working medium to generate the gas working medium, then the gas working medium is expanded to do work for power generation, and the working medium after doing work for power generation may enter the hot side of the liquid heater 73 to release heat and reduce pressure, and then is introduced into the working medium air chamber 62.

Specifically, the liquid storage assembly 7 in the present embodiment includes the liquid storage tank 71 and the liquid heater 73. The outlet of the liquid storage tank 71, the liquid heater 73 and the inlet of the liquid storage tank 71 are sequentially connected by the pressure maintaining pipeline. It may be known that the pressure maintaining pipeline is provided with a liquid pump 72, that is, the liquid storage assembly 7 includes the liquid storage tank 71, the liquid pump 72 and the liquid heater 73. The liquid storage tank 71 is a heat insulation container used for storing the liquid working medium, the liquid pump 72 is used for transporting the liquid working medium, an inlet of the liquid pump 72 communicates with the outlet of the liquid storage tank 71, and the liquid heater 73 is used for heating and vaporizing the liquid working medium flowing out of the liquid pump 72. It may be known that the liquid heater 73 is essentially a heat exchanger which includes a cold side and a hot side. An inlet of the cold side of the liquid heater 73 communicates with an outlet of the liquid pump 72, an outlet of the cold side of the liquid heater 73 communicates with the inlet of the liquid storage tank 71, an inlet of the hot side of the liquid heater 73 communicates with an outlet of a working medium expander unit, and an outlet of the hot side of the liquid heater 73 communicates with the working medium gas chamber 62. In the present embodiment, the preferred working pressure of the liquid storage tank 71 ranges from 1 MPa to 30 MPa. The gas working medium discharged by the working medium expander unit passes through the liquid heater 73, to heat the liquid working medium flowing out of the liquid pump 72 to vaporize, and then the vaporized working medium is returned to the liquid storage tank 71 to maintain the pressure of the liquid storage tank 71, so that an normal operation of the liquid storage tank 71 is ensured, and heat of the gas working medium discharged by the working medium expander unit is utilized, and thus energy efficiency of the cascaded energy storage system is improved.

In some embodiments, the heat storage assembly 3 includes a plurality of groups of high temperature tanks and low temperature tanks, where each group of the high temperature tanks and low temperature tanks includes a hot tank and a cold tank which are used in pairs. A heat transfer medium in the cold tank is a heat transfer medium with low-temperature, the heat transfer medium may flow into the heat exchanger to absorb heat, then temperature of the heat transfer medium is raised, and then the heat transfer medium is stored in the hot tank. A heat transfer medium in the hot tank is a heat transfer medium with high-temperature, and the heat transfer medium with high-temperature may flow into the heat exchanger to release heat, then temperature of the heat transfer medium is reduced, and then the heat transfer medium is stored in the cold tank. In the present embodiment, the plurality of groups of the high temperature tanks and low temperature tanks may release heat or store heat to the air compression and energy release assembly and the working medium gas-liquid conversion assembly under different operation conditions of the air compression energy and release assembly and the working medium gas-liquid conversion assembly, respectively.

The gas storage 6 in the present embodiment has relatively low gas storage pressure and good safety. Volume of the gas storage 6 is reduced by more than 80% than volume of an atmospheric pressure gas storage. Under a gas storage pressure of 3 MPa or above 3 MPa, the volume of the gas storage 6 is less than volume of a high-pressure gas storage with a fixed volume. Under a normal operation condition, compression and expansion processes of the air and the working medium work are all operating under a constant working condition, and there is no throttling loss, so that efficiency of energy storage is high. In addition, the energy storage system according to the present embodiment is controllable in cost of construction, and may be applied to an industrial user side of a megawatt level for energy storage, and may also be applied to energy storage at a power grid side or a power supply side of a ten-megawatt level or a hundred-megawatt level for energy storage.

In some embodiments, the air compression and energy release assembly includes an air compression assembly 1. The air compression assembly 1 includes an air compressor unit and an air heat exchanger unit. An outlet of the air compressor unit is connected to an inlet of the air chamber 61, and the air compressor unit is configured to compress air. The air heat exchanger unit is configured to recover heat in compressed air discharged by the air compressor unit, and transfer the heat to the heat storage assembly 3. The compressed air after heat exchange is transported to the air chamber 61.

Specifically, the air compressor unit includes air compressors which are connected in series in multiple-stages. The air heat exchanger unit includes air heat exchangers in multiple-stages, where a quantity of the air compressors is same as a quantity of the air heat exchangers, and the air compressors and the air heat exchangers are used in pairs and are in one-to-one correspondence with each other. It is easy to be understood that air is introduced into an inlet of the air compressor, and is compressed to form compressed air. Air compression heat will be generated during a process of air compression. One stage of the air compressor corresponds to one stage of the air heat exchanger, so that the air compression heat is recovered in time through the air heat exchanger, and the recovered heat is stored in the heat storage assembly 3.

Figure 2:
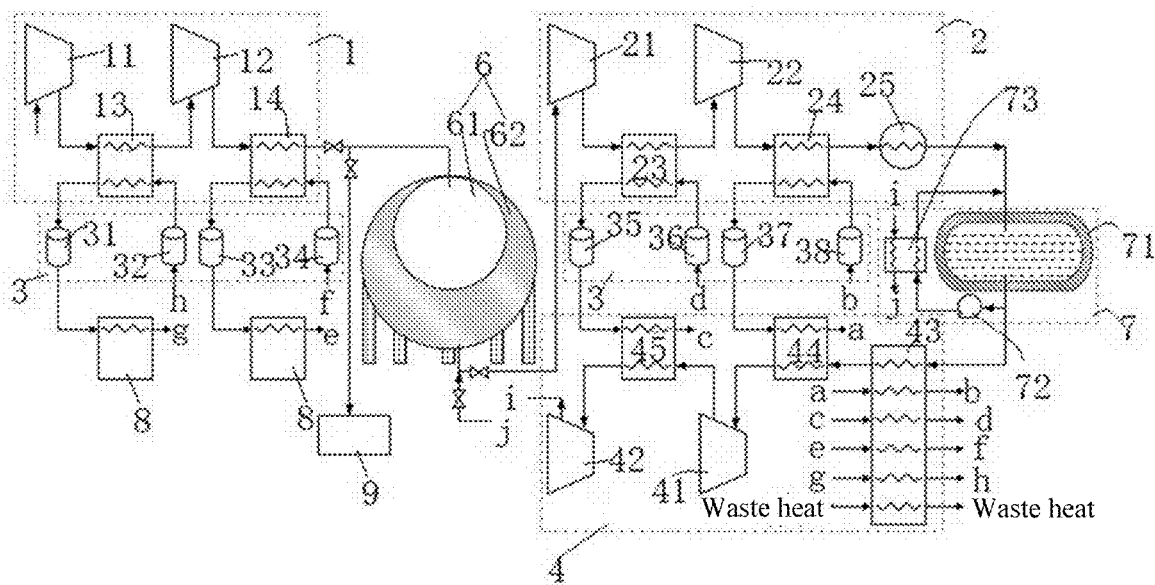
FIG. 2 is a schematic structural diagram of a cascaded energy storage system according to an embodiment of the present disclosure.
Figure 3:
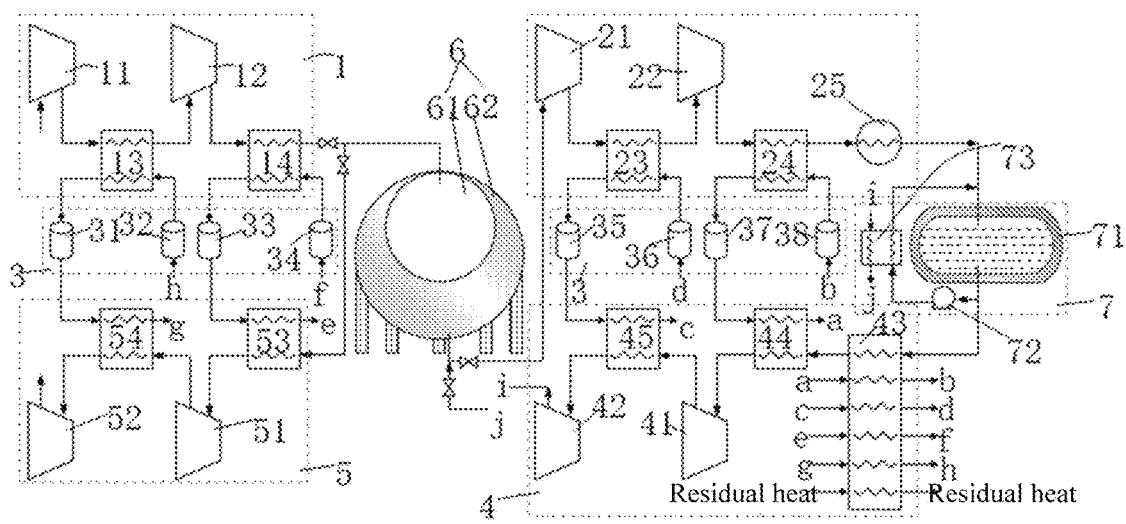
FIG. 3 is a schematic structural diagram of a cascaded energy storage system according to an embodiment of the present disclosure.
Figure 4:
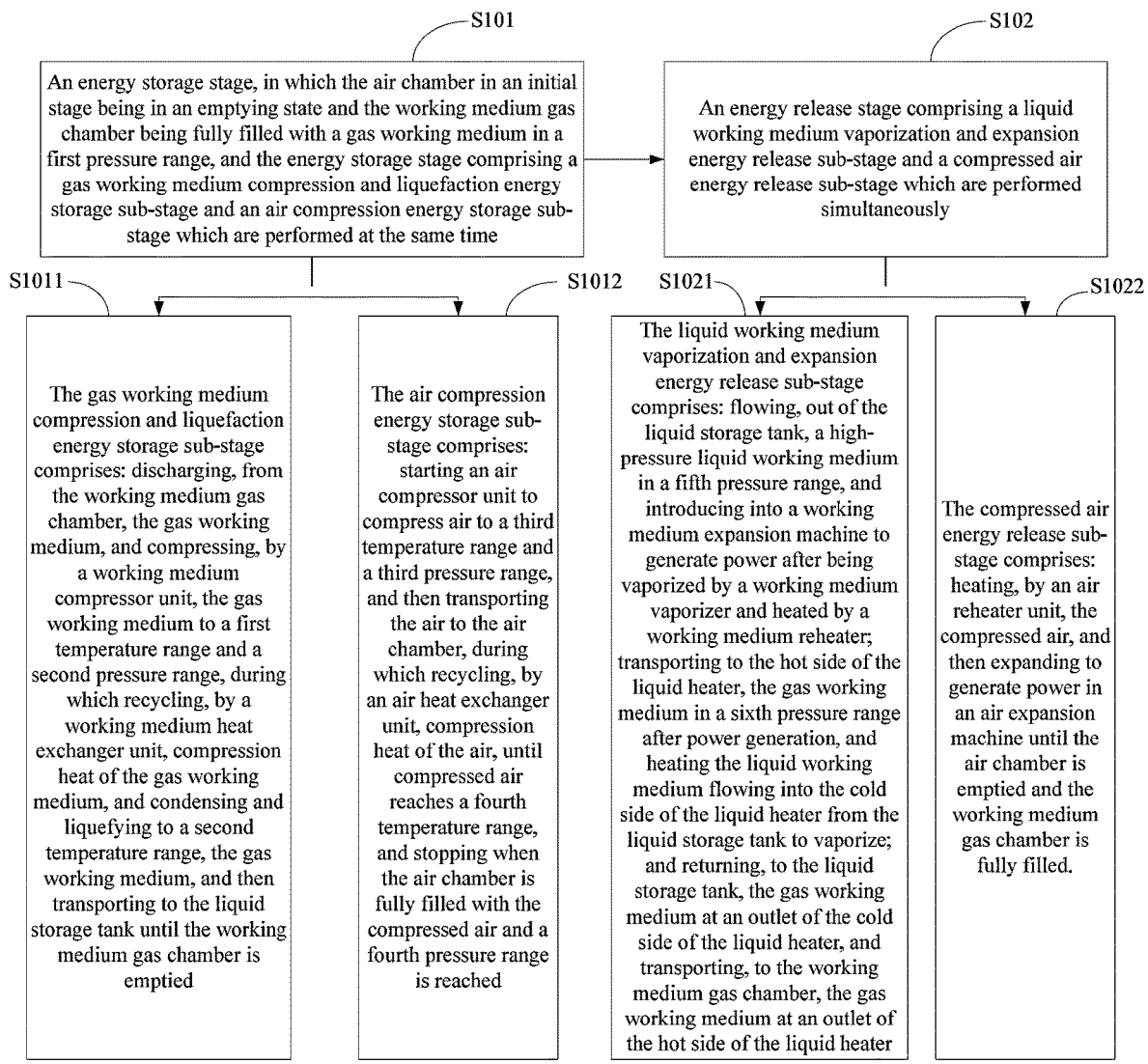
FIG. 4 is a schematic structural diagram of an energy storage method for a cascaded energy storage system according to an embodiment of the present disclosure.

Illustratively, as shown in FIG. 2 and FIG. 3, the air compressor unit in the present embodiment includes two stages of the air compressors, that is, a first air compressor 11 and a second air compressor 12. The air heat exchanger unit includes two stages of the air heat exchangers, that is, a first air heat exchanger 13 and a second air heat exchanger 14. Air is compressed by the first air compressor 11, and the discharged compressed air passes through the first air heat exchanger 13 and exchanges heat with a heat transfer medium (such as high-pressure water) from a first cold tank 32. The heat transfer medium absorbs heat to raise the temperature and then flows into a first hot tank 31 for storage. The compressed air is then compressed to a specified pressure (for example, 1 MPa) by the second air compressor 12, the discharged compressed air passes through the second air heat exchanger 14 and exchanges heat with a heat transfer medium from a second cold tank 34, the heat transfer medium absorbs heat to raise the temperature and then flows into a second hot tank 33 for storage, and then the compressed air is transported into the air chamber 61 for storage.

In some embodiments, the air compression and energy release assembly further includes an air expansion assembly 5. An inlet of the air expansion assembly 5 is connected to an outlet of the air chamber 61, and the air expansion assembly 5 is configured to generate power from expansion of the compressed air. The air expansion assembly 5 includes an air expander unit and an air reheater unit, and the compressed air in the air chamber 61 enters the air expander unit to expand to generate power. The air reheater unit is configured to heat the compressed air entering the air expander unit.

Specifically, the inlet of the air expansion assembly 5 is connected to the outlet of the air chamber 61, and the air expansion assembly 5 is configured to generate power from expansion of compressed air. The air expander unit includes air expanders which are connected in series in multiple-stages, and the air reheater unit includes air reheaters in multiple-stages. A quantity of the air expanders is same as a quantity of the air reheaters, and the air expanders and the air reheaters are used in pairs and are in one-to-one correspondence with each other. It is easy to be understood that an inlet of the air expander is connected to the air chamber 61. The air chamber 61 discharges the compressed air, the compressed air exchanges heat with the heat transfer medium with high-temperature from the heat storage assembly 3 through the air reheater to heat the compressed air, and then enters the air expander to do work for power generation.

Illustratively, as shown in FIG. 2 and FIG. 3, the air expander unit in the present embodiment includes two stages of the air expanders, that is, a first air expander 51 and a second air expander 52. The air reheater unit includes two stages of the air reheaters, that is, a first air reheater 53 and a second air reheater 54. The compressed air discharged by the air chamber 61 enters the first air reheater 53 and exchanges heat with the heat transfer medium from the second hot tank 33, the heat transfer medium releases heat to cool down and then flows into the second cold tank 34 for storage. The compressed air after heat exchange is expanded for power generation by the first air expander 51. The air discharged by the first air expander 51 passes through the second air reheater 54 and exchanges heat with the heat transfer medium from the first hot tank 31, the heat transfer medium releases heat to cool down and further releases residual heat and then flows into the first cold tank 32 for storage, and the air is expanded for power generation by the second air expander 52.

In some embodiments, the working medium compression assembly 2 includes a working medium compressor unit, a working medium heat exchanger unit and a working medium condenser 25. The working medium compressor unit is configured to compress a gas working medium. The working medium heat exchanger unit is configured to recover heat of the working medium compressed gas discharged by the working medium compressor unit and transfer the heat to the heat storage assembly 3. The working medium condenser 25 is connected to the working medium compressor unit and configured to condense the working medium compressed gas into a liquid working medium, and the liquid working medium is transported into the liquid storage tank 71.

Specifically, the working medium compressor unit includes working medium compressors which are connected in series in multiple-stages. The working medium heat exchanger unit includes working medium heat exchangers in multiple-stages. A quantity of the working medium compressors is same with a quantity of the working medium heat exchangers, and the working medium compressors and the working medium heat exchangers are used in pairs and are in one-to-one correspondence with each other. It is easy to be understood that an inlet of the working medium compressor is connected to the working medium gas chamber 62. The gas working medium which is transported into the working medium compressors is compressed to form the compressed gas working medium. Compression heat of the working medium is generated during a compressing process of the gas working medium, one stage of the working medium compressor corresponds to one stage of the working medium heat exchanger, the working medium heat exchangers are used for recovering the heat from the compressed gas working medium, and the recovered heat is stored in the heat storage assembly 3.

Illustratively, as shown in FIG. 2 and FIG. 3, the working medium compressor unit in the present embodiment includes two stages of the working medium compressors, that is, a first working medium compressor 21 and a second working medium compressor 22. The working medium heat exchanger unit includes two stages of the working medium heat exchangers, that is, a first working medium heat exchanger 23 and a second working medium heat exchanger 24. The gas working medium discharged by the working medium gas chamber 62 is compressed by the first working medium compressor 21. The compressed gas working medium discharged by the first working medium compressor 21 passes through the first working medium heat exchanger 23 and exchanges heat with a heat transfer medium from a third cold tank 36, and the heat transfer medium absorbs the heat to raise the temperature and then flows into a third hot tank 35 for storage. The compressed gas working medium after heat exchange is then compressed to a specified pressure (for example, 7 MPa) by the second working medium compressor 22. The compressed gas working medium discharged by the second working medium compressor 22 passes through the second working medium heat exchanger 24 and exchanges heat with a heat transfer medium from a fourth cold tank 38, and the heat transfer medium absorbs the heat to raise the temperature and then flows into a fourth hot tank 37 for storage. The compressed gas working medium after heat exchange by the second working medium heat exchanger 24 is then liquefied by the working medium condenser 25, the working medium condenser 25 releases latent heat of liquefaction of the working medium to the environment, and the liquid working medium flows into the liquid storage tank 71 for storage.

In some embodiments, the working medium expansion assembly 4 includes a working medium expander unit, a working medium reheater unit and a working medium vaporizer 43. The liquid working medium is vaporized, and then is expanded to generate power in the working medium expander unit. The working medium reheater unit is configured to heat the gas working medium entering the working medium expander unit. An inlet of the working medium vaporizer 43 is connected to the outlet of the liquid storage tank 71, and an outlet of the working medium vaporizer 43 is connected to the working medium reheater unit. The working medium vaporizer 43 is used for heating to vaporize the liquid working medium. An outlet of the working medium expander unit is connected to the liquid heater 73.

Specifically, an inlet of the working medium expansion assembly 4 is connected to the outlet of the liquid storage tank 71 for vaporizing the liquid working medium to expand for power generation. The working medium expander unit includes a working medium vaporizer 43, and working medium expanders which are connected in series in multiple-stages. The working medium reheater unit includes working medium reheaters in multiple-stages. A quantity of the working medium expanders is same as a quantity of the working medium reheaters, and the working medium expanders and the working medium reheaters are used in pairs and are in one-to-one correspondence with each other. It is easy to be understood that the inlet of the working medium vaporizer 43 is connected to the outlet of the liquid storage tank 71, and is used for vaporizing and heating a liquid working medium to obtain the gas working medium. The gas working medium enters the working medium reheaters, and exchanges heat with the high-temperature heat transfer medium from the heat storage assembly 3 for being heated, to make temperature of the gas working medium be further raised, and then the gas working medium enters the working medium expanders to do work for power generation.

Illustratively, as shown in FIG. 2 and FIG. 3, the working medium expander unit in the present embodiment includes two stages of the working medium expanders, that is, a first working medium expander 41 and a second working medium expander 42. The working medium reheater unit includes two stages of the working medium reheaters, that is, a first working medium reheater 44 and a second working medium reheater 45. The liquid working medium flows out the liquid storage tank 71 is vaporized by the working medium vaporizer 43. The vaporized gas working medium passed through the first working medium reheater 44 to exchange heat with the heat transfer medium from the fourth hot tank 37, and the heat transfer medium releases heat to cool down and passes through the working medium vaporizer 43 for further releasing residual heat and then flows into the fourth cold tank 38 for storage. The gas working medium after heat up by the first working medium reheater 44 is expanded for power generation by the first working medium expander 41, the gas working medium discharged by the first working medium expander 41 passes through the second working medium reheater 45 to exchange heat with the heat transfer medium from the third hot tank 35, and the heat transfer medium releases heat to cool down and passes through the working medium vaporizer 43 for further releasing residual heat and then flows into the third cold tank 36 for storage. The gas working medium discharged by the second working medium reheater 45 is expanded for power generation by the second working medium expander 42. After the pressure is reduced to a specified pressure (for example, 1 MPa), the gas working medium discharged by the second working medium expander 42 enters the hot side of the liquid heater 73 through an i port of the liquid heater 73 to heats the liquid working medium which flows from the liquid storage tank 71 to the cold side of the liquid heater 73 to vaporize the liquid working medium, the vaporized working medium is returned to the liquid storage tank 71 to maintain pressure of the liquid storage tank 71 (such as 7 MPa), and after being cooled by the liquid heater 73, the gas working medium discharged by a j port of the liquid heater 73 is transported into the working medium gas chamber 62. In the present embodiment, the liquid storage tank 71 maintains a constant pressure during an energy release process, and the working medium in the liquid storage tank 71 is fully released as much as possible in the energy release process. In addition, temperature of the working medium entering the working medium gas chamber may also be reduced.

In some embodiments, a plurality of heating channels are provided in the working medium vaporizer 43 for absorbing residual heat from the heat storage assembly 3 and external residual heat.

The plurality of heating channels are provided in the working medium vaporizer 43, which may be provided to the working medium vaporizer 43 for vaporizing the liquid working medium if there is residual heat, external residual heat or waste heat, where an a is an inlet of a certain heating channel of the working medium vaporizer 43, a b is an outlet corresponding to a, a c is an inlet of a certain heating channel of the working medium vaporizer 43, a d is an outlet corresponding to c, an e is an inlet of a certain heating channel of the working medium vaporizer 43, an f is an outlet corresponding to e, a g is an inlet of a certain heating channel of the working medium vaporizer 43, and an h is an outlet corresponding to g. Illustratively, as shown in FIG. 2 and FIG. 3, the heat transfer medium from the first hot tank 31 exchanges heat to release heat to cool down and then enters the working medium vaporizer 43 through the g port of the working medium vaporizer 43, to vaporize the liquid working medium, and then enters the first cold tank 32 through the h port. Similarly, the heat transfer medium from the second hot tank 33 exchanges heat to release heat to cool down and then enters the working medium vaporizer 43 through the e port of the working medium vaporizer 43, to vaporize the liquid working medium, and then enters the second cold tank 34 through the f port. Similarly, the heat transfer medium from the third hot tank 35 exchanges heat to release heat to cool down and then enters the working medium vaporizer 43 through the c port of the working medium vaporizer 43, to vaporize the liquid working medium, and then enters the third cold tank 36 through the d port. The heat transfer medium from the fourth hot tank 37 exchanges heat to release heat to cool down and then enters the working medium vaporizer 43 through the port of the working medium vaporizer 43, to vaporize the liquid working medium, and then enters the fourth cold tank 38 through the b port.

In a second aspect, the present disclosure also provided an energy storage method for a cascaded energy storage system, which is performed by using the energy storage system in any one of the foregoing embodiments, and it is assumed that the working medium is carbon dioxide, which includes following processes:

S101, an energy storage stage, in which the air chamber 61 in an initial stage being in an emptying state and the working medium gas chamber 62 being fully filled with a gas working medium in a first pressure range, and the energy storage stage including a gas working medium compression and liquefaction energy storage sub-stage and an air compression energy storage sub-stage which are performed simultaneously, where S1011, the gas working medium compression and liquefaction energy storage sub-stage includes: discharging, from the working medium gas chamber 62, the gas working medium, and compressing, by a working medium compressor, the gas working medium to a first temperature range and a second pressure range, during which recovering, by a working medium heat exchanger, compression heat of the gas working medium, and condensing and liquefying to a second temperature range, the gas working medium, and then transporting to the liquid storage tank 71 until the air chamber 61 is fully filled and the working medium gas chamber 62 is emptied;

S1012, the air compression energy storage sub-stage includes: starting an air compressor to compress air to a third temperature range and a third pressure range, during which recovering, by an air heat exchanger, compression heat of the air, until compressed air reaches to a fourth temperature range, transporting the air to the air chamber 61, and stopping when the air chamber 61 is fully charged with the compressed air and a fourth pressure range is reached; and S102, an energy release stage including a liquid working medium vaporization and expansion energy release sub-stage and a compressed air energy release sub-stage which are performed simultaneously, where:

Optionally, S1022, the liquid working medium vaporization and expansion energy release sub-stage includes: flowing, out of the liquid storage tank 71, a high-pressure liquid working medium in a fifth pressure range, and transporting into a working medium expander to generate power after being vaporized by a working medium vaporizer 43 and heated by a working medium reheater, transporting to the hot side of the liquid heater 73, the gas working medium in a sixth pressure range after power generation, heating the liquid working medium flowing into the cold side of the liquid heater 73 from the liquid storage tank 71 to vaporize, returning, to the liquid storage tank 71, the gas working medium at an outlet of the cold side of the liquid heater 73; and transporting, to the working medium gas chamber 62, the gas working medium at an outlet of the hot side of the liquid heater 73; and the compressed air energy release sub-stage includes: transporting, from the air chamber 61, the compressed air to a gas consumer, or, heating, by an air reheater, the compressed air, and then expanding to generate power in an air expander until the air chamber 61 is emptied and the working medium gas chamber 62 is fully filled.

In some embodiments, the first pressure ranges from 0.5 MPa to 15 MPa, the first temperature ranges from 100° C. to 500° C., the second pressure ranges from 1 MPa to 30 MPa, the second temperature ranges from 20° C. to 30° C., the third temperature ranges from 100° C. to 500° C., the third pressure ranges from 0.5 MPa to 15 MPa, the fourth temperature ranges from 20° C. to 40° C., and the fourth pressure ranges from 0.5 MPa to 15 MPa.

In some embodiments, the fifth pressure ranges from 1 MPa to 30 MPa, and the sixth pressure ranges from 0.5 MPa to 15 MPa.

Specifically, at the beginning, the air chamber 61 in the gas storage 6 is in an emptying state, and the working medium gas chamber is in a state that a working medium with a preset pressure is fully filled.

Specifically, when the energy storage system stores energy, air is compressed by the first air compressor 11, the discharged compressed air passes through the first air heat exchanger 13 to exchange heat with a heat transfer medium (such as high-pressure water) from the first cold tank 32, and the heat transfer medium absorbs the heat to raise the temperature and flows into the first hot tank 31 for storage. The compressed air is then compressed to a specified pressure (for example, 1 MPa) by the second air compressor 12, then the discharged compressed air passes through the second air heat exchanger 14 to exchange heat with a heat transfer medium from a second cold tank 34, the heat transfer medium absorbs heat to raise the temperature and flows into a second hot tank 33 for storage, and then the compressed air is transported into the air chamber 61 for storage. Meanwhile, a working medium discharged by the working medium gas chamber is compressed by the first working medium compressor 21, the discharged compressed gas working medium passes through the first working medium heat exchanger 23 to exchange heat with a heat transfer medium from the third cold tank 36, and the heat transfer medium absorbs heat to raise the temperature and flows into a third hot tank 35 for storage. The compressed gas working medium is compressed to a specified pressure (for example, 7 MPa) by the second working medium compressor 22, the discharged compressed gas working medium passes through the second working medium heat exchanger 24 to exchange heat with a heat transfer medium from a fourth cold tank 38, the heat transfer medium absorbs heat to raise the temperature and flows into a fourth hot tank 37 for storage, and then the compressed gas working medium is liquefied by the working medium condenser 25.

The working medium condenser 25 releases latent heat of liquefaction of the working medium to the environment, and the liquid working medium flows into the liquid storage tank 71 for storage. The energy storage is finished when the air chamber 61 is fully filled and the working medium gas chamber is empty.

During energy release, the liquid working medium with a pressure of 7 MPa flows out of the liquid storage tank 71, and is vaporized by the working medium vaporizer 43. The working medium then passes through the first working medium reheater 44 to exchange heat with a heat transfer medium from the fourth hot tank 37. The heat transfer medium releases heat to cool down and then passes through the working medium vaporizer 43 to further release residual heat, and then flows into the fourth cold tank 38 for storage. The working medium is expanded for power generation by the first working medium expander 41, and the discharged working medium passes through the second working medium reheater 45 to exchange heat with the heat transfer medium from the third hot tank 35. The heat transfer medium releases heat to cool down and then passes through the working medium vaporizer 43 to further release residual heat, and then flows into the third cold tank 36 for storage. The working medium is then expanded for power generation by the second working medium expander 42, and the pressure is reduced to a specified pressure (1 MPa). The working medium discharged by the second working medium expander 42 passes through the hot side of the liquid heater 73 to heat the liquid working medium transported by a liquid pump 72 from the liquid storage tank 71 to vaporize the liquid working medium, and the vaporized working medium is returned to the liquid storage tank 71 to maintain pressure of the liquid storage tank 71 (7 MPa). The working medium discharged by the working medium expander 42 flows into the working medium gas chamber through the port on the hot side of the liquid heater 73. Meanwhile, the compressed air with a pressure of 1 MPa which is discharged by the air chamber 61 passes through the first air reheater 53 to exchange heat with the heat transfer medium from the second hot tank 33. The heat transfer medium releases heat to cool down and then passes through the working medium vaporizer 43 to further release residual heat, and then flows into the second cold tank 34 for storage. The air is then expanded for power generation by the first air expander 51, and the discharged air passes through the second air reheater 54 to exchange heat with the heat transfer medium from the first hot tank 31. The heat transfer medium releases heat to cool down and then passes through the working medium vaporizer 43 to further release residual heat, and then flows into the first cold tank 32 for storage. The air is then expanded for power generation by the second air expander 52. If there is waste heat outside, the waste heat may be provided to the working medium vaporizer 43 for vaporizing the liquid working medium. The energy release is finished when the working medium gas chamber is fully filled and the air chamber 61 is empty.

In addition, it may be known that, in some embodiments, as shown in FIG. 2, when the air compression and energy release assembly does not include the air expansion assembly 5, for an application scenario in which the compressed air is directly needed, the cascaded energy storage system may directly transport the compressed air to a gas consumer 9 through the air chamber 61 at the peak of power consumption. The compression heat of the air stored in the heat storage assembly 3 may be transported to a heat consumer 8. The specific energy storage process is same as that described above, and details are not described herein again.

In the energy release process, the working medium vaporization and energy release process is same as the first embodiment. When the air chamber 61 releases the compressed air, the compressed air is directly supplied to the gas consumer 9, the first hot tank 31 and the second hot tank 33 provide heat to the heat consumer 8, and the heat transfer medium passes through the working medium vaporizer 43 to further release the residual heat and then flows into the first cold tank 32 and the second cold tank 34 for storage.

In the above-mentioned embodiments, the gas storage volume is 10% of that of the gas storage mode with atmospheric pressure, and the gas storage pressure is relatively less, which is only 10% of the gas storage pressure (10 MPa) of the compressed air energy storage mode. If the gas storage pressure is further increased to 3.3 MPa, the gas storage volume is 3% of that of the gas storage mode with atmospheric pressure, and the gas storage volume is equivalent to the volume of the gas storage with high-pressure with a fixed volume, so that it may be adopted to energy storage of the industrial user side, the power grid side and the power supply side.

It should be noted that, in the description of the present disclosure, the terms "first", "second" and the like are used for purposes of description, but are not intended to be understood as indicating or implying relative importance. In addition, in the description of the present disclosure, unless otherwise specified, "a plurality of" means two or more.

Any description of the process or the method in the flowchart or otherwise described herein may be understood to representing as including one or more a module, segment or portion, of code of executable instructions of steps, of a process or for implementing a specific logical function. The scope of the preferred embodiments of the present disclosure includes other implementations, in which functions may be performed out of the order shown or discussed, including in a substantially simultaneous manner or in a reverse order according to the functionality involved, which should be understood by a person skilled in the art to which the embodiments of the present disclosure belong.

In the description of the specification, descriptions referring to the terms "one embodiment", "some embodiments", "example", "specific example" or "some examples" means that a particular feature, structure, material, or characteristic described with reference to the embodiment or example is included in at least one embodiment or example of the present disclosure. In the specification, the schematic description of the above terms does not necessarily refer to the same embodiment or example. Moreover, the specific feature, structure, material or characteristic may be combined in any suitable manner in at least one embodiment or example.

Although the embodiments of the present disclosure have been shown and described above, it may be understood that the above-mentioned embodiments are exemplary, and should not be understood as limitations of the present disclosure. A person skilled in the art may make changes, modifications, substitutions and variations to the above-mentioned embodiments within the scope of the present disclosure.

What is claimed is:
1. A cascaded energy storage system, comprising:
a gas storage which is divided into at least one air chamber and at least one working medium gas chamber by a flexible diaphragm, pressure of the air chamber being equal to pressure of the working medium gas chamber, and volume of the air chamber and volume of the working medium gas chamber being capable of being adjusted by contraction and expansion of the flexible diaphragm;

an air compression and energy release assembly which communicates with the air chamber, and is configured to introduce compressed air into the air chamber and release the compressed air;

a working medium gas-liquid conversion assembly comprising a working medium compression assembly, a working medium expansion assembly and a liquid storage assembly, wherein the liquid storage assembly comprises a liquid storage tank and a liquid heater; an outlet of the working medium gas chamber, the working medium compression assembly and an inlet of the liquid storage tank are sequentially connected through a working medium hydraulic pipeline; an outlet of the liquid storage tank, the working medium expansion assembly, a hot side of the liquid heater and an inlet of the working medium gas chamber are sequentially connected through a working medium vaporization pipeline; and the outlet of the liquid storage tank, and a cold side of the liquid heater and the inlet of the liquid storage tank are sequentially connected through a pressure maintaining pipeline; and a heat storage assembly, configured to release heat or store heat to the air compression and energy release assembly and the working medium gas-liquid conversion assembly under different working conditions of the air compression and energy release assembly and the working medium gas-liquid conversion assembly.

2. The energy storage system according to claim 1, wherein the air compression and energy release assembly comprises an air compression assembly, the air compression assembly comprises an air compressor unit and an air heat exchanger unit, an outlet of the air compressor unit is connected to an inlet of the air chamber, the air compressor unit is configured to compress air, the air heat exchanger unit is configured to recover heat in compressed air discharged by the air compressor unit and transfer the heat to the heat storage assembly, and the compressed air after heat exchange is transported into the air chamber.

3. The energy storage system according to claim 2, wherein the air compressor unit comprises air compressors which are connected in series in multiple-stages, the air heat exchanger unit comprises air heat exchangers in multiple-stages, and the air compressors are in one-to-one correspondence with the air heat exchangers.

4. The energy storage system according to claim 3, wherein the air compression and energy release assembly further comprises an air expansion assembly, an inlet of the air expansion assembly is connected to an outlet of the air chamber, and the air expansion assembly is configured to expand the compressed air to generate power, wherein the air expansion assembly comprises an air expander unit and an air reheater unit, the compressed air in the air chamber enters the air expander unit to expand to generate power, and the air reheater unit is configured to heat the compressed air entering the air expander unit.

5. The energy storage system according to claim 4, wherein the air reheater unit heats the compressed air entering the air expander unit by using heat of the heat storage assembly.

6. The energy storage system according to claim 4, wherein the air expander unit comprises air expanders connected in series in multiple-stages, the air reheater unit comprises air reheaters in multiple-stages, and the air expanders are in one-to-one correspondence with the air reheaters.

7. The energy storage system according to claim 1, wherein the outlet of the air chamber is connected with a pipeline of a gas consumer.

8. The energy storage system according to claim 1, wherein the heat storage assembly communicates with a pipeline of a heat consumer.

9. The energy storage system according to claim 1, wherein the working medium compression assembly comprises a working medium compressor unit, a working medium heat exchanger unit and a working medium condenser, wherein the working medium compressor unit is configured to compress a gas working medium, the working medium heat exchanger unit is configured to recover heat of a compressed gas working medium which is discharged by the working medium compressor unit and transfer the heat to the heat storage assembly, the working medium condenser is connected to the working medium compressor unit and configured to condense the compressed gas working medium into a liquid working medium, and the liquid working medium is transported into the liquid storage tank.

10. The energy storage system according to claim 9, wherein the working medium compressor unit comprises working medium compressors which are connected in series in multiple-stages, the working medium heat exchanger unit comprises working medium heat exchangers in multiple-stages, and the working medium compressors are in one-to-one correspondence with the working medium heat exchangers.

11. The energy storage system according to claim 10, wherein the working medium expansion assembly comprises a working medium expander unit, a working medium reheater unit and a working medium vaporizer, wherein the liquid working medium after being vaporized is expanded to generate power in the working medium expander unit; the working medium reheater unit is configured to heat the compressed gas working medium entering the working medium expander unit; an inlet of the working medium vaporizer is connected to the outlet of the liquid storage tank, an outlet of the working medium vaporizer is connected to the working medium reheater unit, and the working medium vaporizer is configured to heat and vaporize the liquid working medium; and an outlet of the working medium expander unit is connected to the liquid heater.

12. The energy storage system according to claim 11, wherein a plurality of heating channels are provided in the working medium vaporizer for absorbing residual heat from the heat storage assembly and external residual heat or waste heat.

13. The energy storage system according to claim 11, wherein the working medium expander unit comprises working medium expanders which are connected in series in multiple-stages, the working medium reheater unit comprises working medium reheaters in multiple-stages, and the working medium expanders are in one-to-one correspondence with the working medium reheaters.

14. The energy storage system according to claim 1, wherein the heat storage assembly comprises a plurality of groups of high temperature tanks and low temperature tanks which are respectively connected to air heat exchangers and air reheaters in the air compression and energy release assembly, working medium heat exchangers of the working medium compression assembly and working medium reheaters of the working medium expansion assembly, and are configured to store heat from the air heat exchangers and the working medium heat exchangers, and releases heat to the air reheaters, the working medium reheaters and a working medium vaporizer of the working medium expansion assembly.

15. The energy storage system according to claim 14, wherein each group of the plurality of groups of the high temperature tanks and the low temperature tanks comprises a hot tank and a cold tank which are used in pairs, wherein a heat transfer medium with low-temperature in the cold tank absorbs the heat in the air heat exchangers and the working medium heat exchangers, and then becomes the heat transfer medium with high-temperature to be stored in the hot tank; and the heat transfer medium in the hot tank releases the heat to the air reheaters, the working medium reheaters and the working medium vaporizer, and then becomes the heat transfer medium with low-temperature to be stored in the cold tank.

16. An energy storage method for a cascaded energy storage system, which is performed by using the energy storage system according to claim 1, comprising:
an energy storage stage, in which the air chamber in an initial stage being in an emptying state and the working medium gas chamber being fully filled with a gas working medium in a first pressure range, and the energy storage stage comprising a gas working medium compression and liquefaction energy storage sub-stage and an air compression energy storage sub-stage which are performed at the same time, wherein
the gas working medium compression and liquefaction energy storage sub-stage comprises: discharging, from the working medium gas chamber, the gas working medium, and compressing, by a working medium compressor unit, the gas working medium to a first temperature range and a second pressure range, during which recovering, by a working medium heat exchanger unit, compression heat of the gas working medium, and condensing and liquefying to a second temperature range, the gas working medium, and then transporting to the liquid storage tank until the working medium gas chamber is emptied;
the air compression energy storage sub-stage comprises: starting an air compressor unit to compress air to a third temperature range and a third pressure range, and then transporting the air to the air chamber, during which recovering, by an air heat exchanger unit, compression heat of the air, until compressed air reaches a fourth temperature range, and stopping when the air chamber is fully filled with the compressed air and a fourth pressure range is reached; and
an energy release stage comprising a liquid working medium vaporization and expansion energy release sub-stage and a compressed air energy release sub-stage which are performed simultaneously, wherein:
the liquid working medium vaporization and expansion energy release sub-stage comprises: flowing, out of the liquid storage tank, a high-pressure liquid working medium in a fifth pressure range, and introducing into a working medium expander to generate power after being vaporized by a working medium vaporizer and heated by a working medium reheater; transporting to the hot side of the liquid heater, the gas working medium in a sixth pressure range after power generation, and heating the liquid working medium flowing into the cold side of the liquid heater from the liquid storage tank to vaporize; and returning, to the liquid storage tank, the gas working medium at an outlet of the cold side of the liquid heater, and transporting, to the working medium gas chamber, the gas working medium at an outlet of the hot side of the liquid heater.

17. The energy storage method according to claim 16, wherein the compressed air energy release sub-stage comprises: heating, by an air reheater unit, the compressed air, and then expanding to generate power in an air expander until the air chamber is emptied and the working medium gas chamber is fully filled.

18. The energy storage method according to claim 16, wherein the compressed air energy release sub-stage comprises: transporting, from the air chamber, the compressed air to a gas consumer, and the recovered compression heat of the air is transported to a heat consumer.

19. The energy storage method according to claim 16, wherein the first pressure range ranges from 0.5 MPa to 15 MPa, the first temperature ranges from 100° C. to 500° C., the second pressure ranges from 1 MPa to 30 MPa, the second temperature ranges from 20° C. to 30° C., the third temperature ranges from 100° C. to 500° C., the third pressure ranges from 0.5 MPa to 15 MPa, the fourth temperature ranges from 20° C. to 40° C., and the fourth pressure ranges from 0.5 MPa to 15 MPa.

20. The energy storage method according to claim 16, wherein the fifth pressure range ranges from 1 MPa to 30 MPa, and the sixth pressure ranges from 0.5 MPa to 15 MPa.

* * * * *